United States Patent [19]

Matsuno

[11] 4,400,011
[45] Aug. 23, 1983

[54] VEHICLE BODY CONSTRUCTION
[75] Inventor: Yoshio Matsuno, Yokohama, Japan
[73] Assignee: Nissan Motor Co., Ltd., Yokohama, Japan
[21] Appl. No.: 244,892
[22] Filed: Mar. 18, 1981
[30] Foreign Application Priority Data
  Mar. 31, 1980 [JP] Japan .......................... 55-43394[U]
[51] Int. Cl.³ .............................................. B60R 21/04
[52] U.S. Cl. ...................................... 280/748; 180/90; 280/751; 280/752; 296/194
[58] Field of Search ........................ 296/194; 180/90; 280/751, 752, 748

[56] References Cited
U.S. PATENT DOCUMENTS
  3,817,582 6/1974 Wilfert ............................... 280/752
  4,317,582 3/1982 Cottin et al. ....................... 280/752

FOREIGN PATENT DOCUMENTS
  2273691 1/1976 France .

Primary Examiner—Robert R. Song

[57] ABSTRACT

A vehicle body construction comprises a dash panel defining a passenger compartment, a car heater core having a casing which is securely connected to the dash panel and located within the passenger compartment, side panels formed connected to the dash panel, and an elongate knee restraining or protection member securely connected to at least one of the side panels and to the car heater core casing, and so positioned as to be strikable with the knees of a vehicle occupant during a vehicle collision, thereby rendering unnecessary various support members for supporting the knee restraining member onto the dash panel.

8 Claims, 4 Drawing Figures

VEHICLE BODY CONSTRUCTION

BACKGROUND OF THE INVENTION

1. Field of the Invention

This invention relates to an improvement in a vehicle body construction, and more particularly to an installation arrangement of a knee restraining or protection device for protecting the knee of vehicle occupants.

2. Description of Prior Art

In connection with vehicle safety systems for protecting vehicle occupants within a passenger compartment of a vehicle, a variety of the systems have been proposed in which a safety seat belt arrangement has been actually employed in many automotive vehicles. Such a safety seat belt arrangement uses a seat belt which prevents a vehicle occupant from being thrown forward or injured in case of an accident or collision of the vehicle. In order to attain further security of the vehicle occupants, a knee protection device has been already proposed to protect the knees of the vehicle occupants, for example, during vehicle collision. The knee protection device is usually designed to be collapsible so as to absorb the shock of the vehicle occupant's knees when the knees strike against the protection device during the vehicle collision.

BRIEF SUMMARY OF THE INVENTION

A vehicle body construction according to the present invention comprises a dash panel defining an engine compartment and a passenger compartment at the both sides thereof and provided with side panels formed at the both side sections thereof. A car heater core has its casing which secured onto the dash panel. Furthermore, an elongate knee restraining member is securely connected to at least one of the side panels and onto the car heater core casing, and so positioned as to be strikable with the knees of a vehicle occupant during a vehicle collision. With the thus arranged vehicle body construction, the knee restraining member can be installed in position without using various support members for supporting it onto the vehicle body, thereby decreasing the number of assembly steps for the vehicle body construction including the knee restraining member.

BRIEF DESCRIPTION OF THE DRAWINGS

The features and advantages of the vehicle body construction according to the present invention will be more clearly appreciated from the following description taken in conjunction with the accompanying drawings in which.

DETAILED DESCRIPTION OF THE INVENTION

Figures 1, 2:
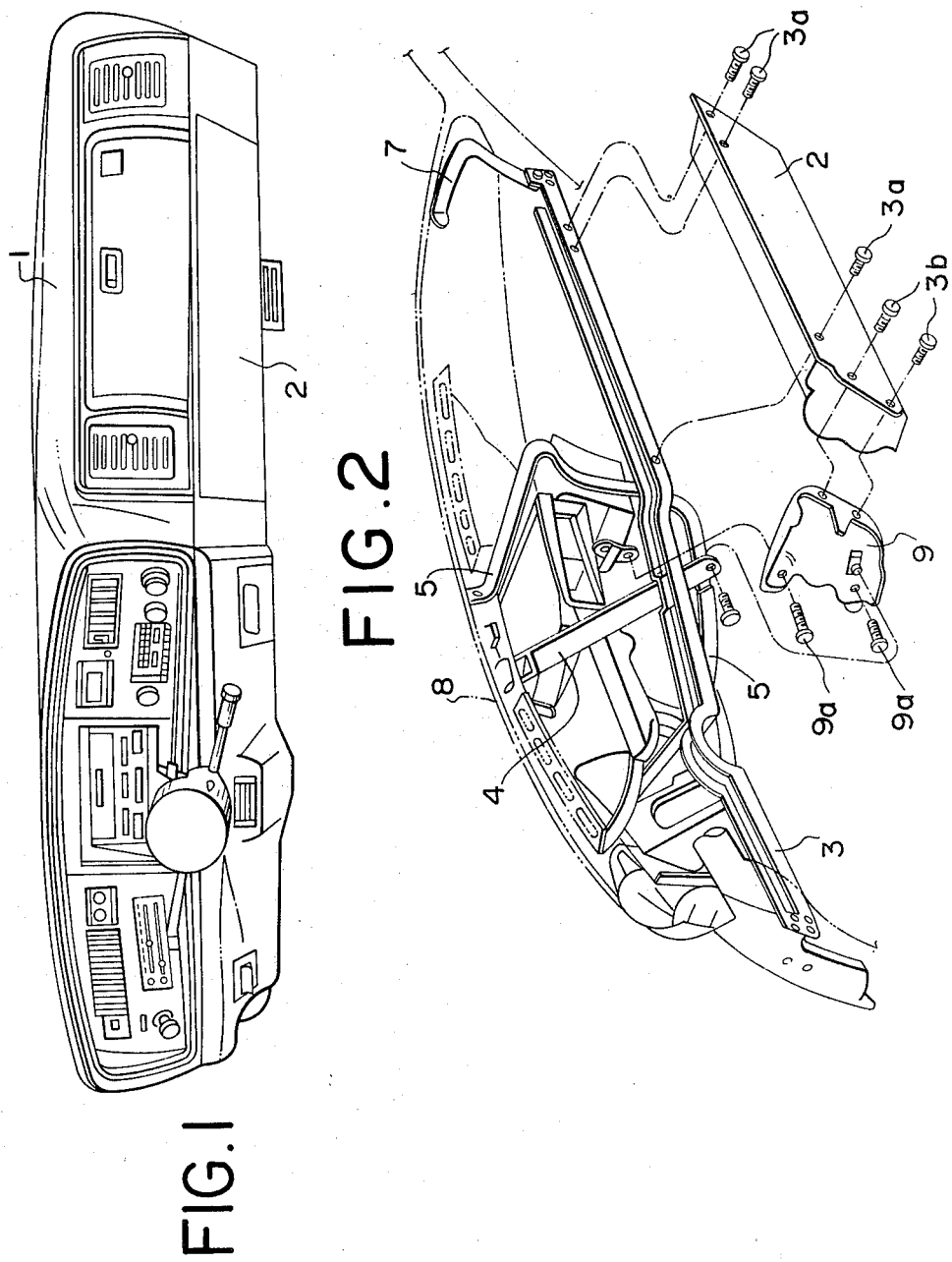
FIG. 1 is an illustration of an instrument panel formed with a conventional knee restraining device.
FIG. 2 is a perspective view including an exploded view of the conventional knee restraining device of FIG. 1.

To facilitate understanding the present invention, a bried reference will be made to an example of a conventional knee restraining or protecting device for vehicle occupants, depicted in FIGS. 1 and 2. Referring to FIG. 1, the conventional knee restraining device includes a knee plate 2 which is formed integrally with an instrument panel 1 and mounted on a vehicle body of an automotive vehicle. As shown in FIG. 2, the knee plate 2 is secured at its upper section to a lateral member 3 with small screws 3a, which lateral member 3 is in turn secured to a cowl box panel 8 by support brackets 5 and 7 which extend from the cowl box panel 8. The knee plate 2 is further secured at its side section to a bracket 9 with small screws 3b, which bracket is in turn connected to a support member 4 and a bracket 6 both securely connected to the cowl box panel 8. The thus arranged knee restraining device is deformed non-elastically when the knees of the vehicle occupant is struck against the knee plate 2, for example, during a vehicle collision, thereby effectively absorb the energy of impact of the vehicle occupant within a vehicle compartment of the vehicle.

However, such a knee restraining device has encountered the problems in which the knee plate thereof is formed integrally with the instrument panel and mounted on the vehicle body by using many members such as the lateral member 3, the support member 4, and the support bracket 5, 7, 9, and therefore the weight of the vehicle body is unavoidably increased and the number of the steps for assemblying the vehicle is also unavoidably increased.

Figure 3:
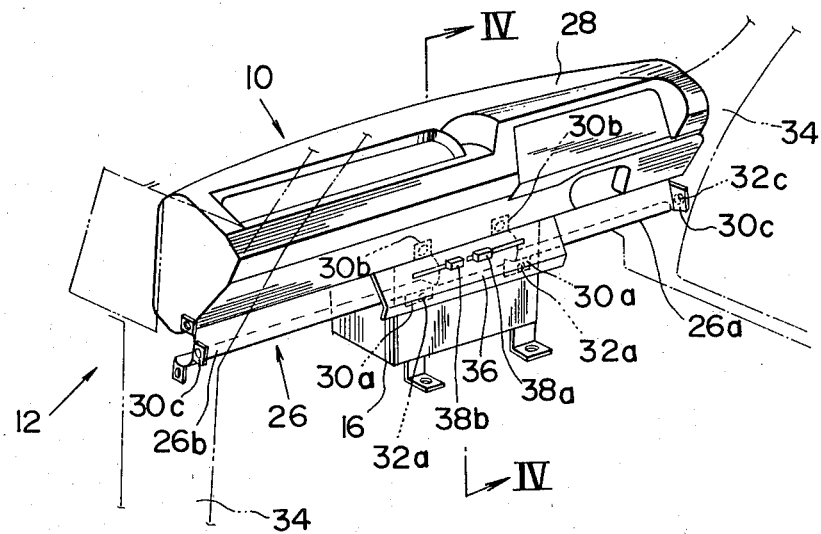
FIG. 3 is a perspective view of a vehicle body construction including a knee restraining device, in accordance with the present invention.
Figure 4:
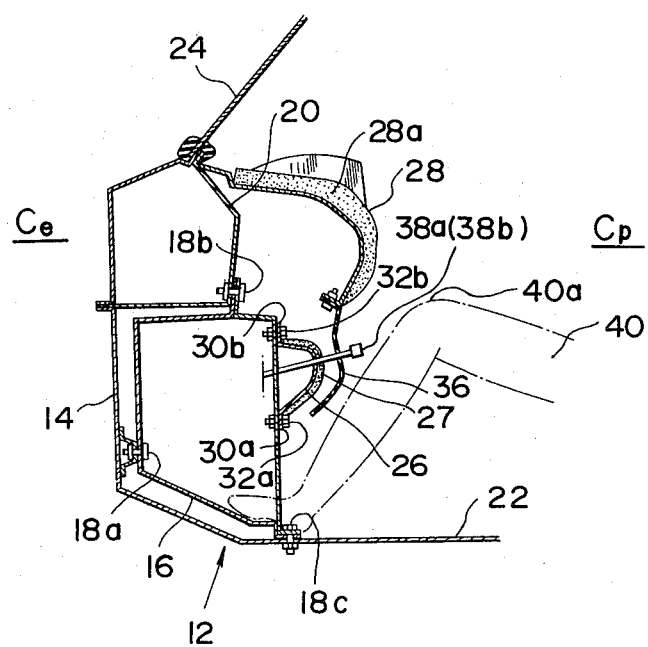
FIG. 4 is a vertical sectional view taken in the direction of arrows substantially along the line IV—IV of FIG. 3.

In view of the above description of the conventional knee restraining device, reference is now made to FIGS. 3 and 4, wherein a preferred embodiment of a vehicle body construction 12 for an automotive vehicle 10, according to the present invention is illustrated. The vehicle body construction 12 comprises a dash panel 14 which defines or divides an engine compartment Ce and a passenger compartment $C_p$ at the both sides thereof. The casing 16 of a car heater core is secured to the dash panel 14 with small screws 18a, to a cowl box panel 20 with small screws 18b, and to a floor panel 22 with screws 18c. The reference numeral 24 designates a windshield.

A laterally elongate metallic knee restraining (protector) member or device 26 is, in this instance, formed of right and left knee restraining members 26a and 26b. The members 26a, 26b are channel-shaped and collapsible or deformable non-elastically. Preferably, the members 26a, 26b are covered with a suitable padding 27 as best seen from FIG. 4. The padding 27 is formed, for example, of urethane foam resin covered with a skin of vinyl chloride resin, or of a resin-molded member. As shown, both the restraining members 26a and 26b are aligned with each other and arranged parallel with an instrument panel 28 which is secured to the cowl box panel 20. The instrument panel 28 includes a padding 28a formed, for example, of urethane foam resin covered with a skin of vinyl chloride resin. Each knee restraining member 26a, 26b is formed at its one end with flange sections 30a and 30b which respectively elongate upward and downward therefrom and further formed at the other end thereof with a flange section 30c which elongates laterally and is bent to contact each of side panels 34. The side panels 34 are integral or securely connected to the both side sections of the dash panel 14 and extend in fore and aft direction of the vehicle body. The flange sections 30a, 30b are respectively formed with laterally elongate openings (not shown) receiving small screws 32a, 32b for securely connecting them onto the heater core casing 16, while the flange sections 30c is formed with an elongate opening (not shown) which elongates in the fore and aft direction of the vehicle body, a small screw 32c being received within the elongate opening to securely connect the flange section 30c with the side panel 34.

A heater control finisher or board 36 is securely connected to the lower section of the instrument panel 28. Heater control levers 38a and 38b are disposed through the heater control finisher 36 and connected to the heater core casing 16.

In operation, when the knees 40a of a vehicle occupant 40 moves forward and strikes against the knee restraining member 26a, 26b during vehicle collision, the knee restraining member is deformed non-elastically to absorb the kinetic energy of the vehicle occupant, thereby softening the shock to the vehicle occupant knees. This prevents the vehicle occupants from being injured even during vehicle collision.

As appreciated from the above, according to the present invention, the knee restraining or protector device is formed separate and independent from the instrument panel and secured onto the heater core casing and onto a part of the vehicle body to function knee protection, and therefore it becomes unnecessary to use various support members for supporting the knee restraining device (member) onto the vehicle body which support members are, for example, indicated by the numerals 3, 4, 5, 6, 7 and 9 in FIG. 2. This contributes to make the vehicle body lighter in weight. Furthermore, the installation of the knee restraining member can be achieved only with small screws and accordingly the installation operation becomes simpler to decrease the number of the steps of assemblying the vehicle body. Additionally, by dividing the knee restraining member into two parts removing the central part thereof, the cost for the vehicle is decreased by the amount coresponding to the central section. Moreover, since the knee restraining member is thus divided into the two parts and further formed independent from the instrument panel, it is possible to install the knee restraining member in position even after the vehicle body has been assembled. This also contributes to simplification in vehicle assembly process and decrease in the number of assembly steps of the vehicle.

What is claimed is:

1. A vehicle body construction, comprising:
   a dash panel defining an engine compartment and a passenger compartment at the opposite sides thereof;
   a car heater core having a casing which is securely connected to said dash panel and located within said passenger compartment;
   side panels formed at the opposite side sections of said dash panel, respectively; and
   an elongate knee restraining member so disposed as to be strikable with knees of a vehicle occupant during a vehicle collision, said knee restraining member being securely connected at one end thereof with one of said side panels and at the other end thereof with said car heater core casing.

2. A vehicle body construction as claimed in claim 1, wherein said knee restraining member is deformable upon striking of the knee of the vehicle occupant during the vehicle collision.

3. A vehicle body construction as claimed in claim 2, wherein said knee restraining member is channel-shaped.

4. A vehicle body construction as claimed in claim 1, wherein said knee restraining member includes first and second knee restraining members, the first knee restraining member being securely connected at its one end onto said car heater core casing and at the other end thereof onto the one of said side panels, said second knee restraining member being securely connected at its one end thereof onto said car heater core casing and the other end thereof onto the other of said side panels.

5. A vehicle body construction as claimed in claim 4, wherein said first and second knee restraining members are separate from each other to form a space therebetween.

6. A vehicle body construction as claimed in claim 5, wherein said space is covered with a car heater control finisher secured to an instrument panel.

7. A vehicle body construction as claimed in claim 3, wherein said knee restraining member is parallel with an instrument panel.

8. A vehicle body construction, comprising:
   a dash panel defining an engine compartment and a passenger compartment at the both sides thereof;
   a car heater core having a casing which is securely connected to said dash panel and located within said passenger compartment;
   side panels formed at the opposite side sections of said dash panel, respectively;
   first and second elongate knee restraining members which are so disposed as to be strikable with the knees of vehicle occupants during a vehicle collision, each of said first and second knee restraining members being securely connected at its one end with one of said side panels and at the other end thereof with said heater core casing, said first and second restraining members being located to be separate from each other to form a space therebetween; and
   a car heater control finisher operatively connected to said car heater core and having a board section, said board section being located to cover the opposite ends of the first and second knee restraining members and said space formed therebetween.

* * * * *